C. J. TROPPMAN.
INSTRUMENT FOR TESTING LENSES.
APPLICATION FILED AUG. 31, 1914.

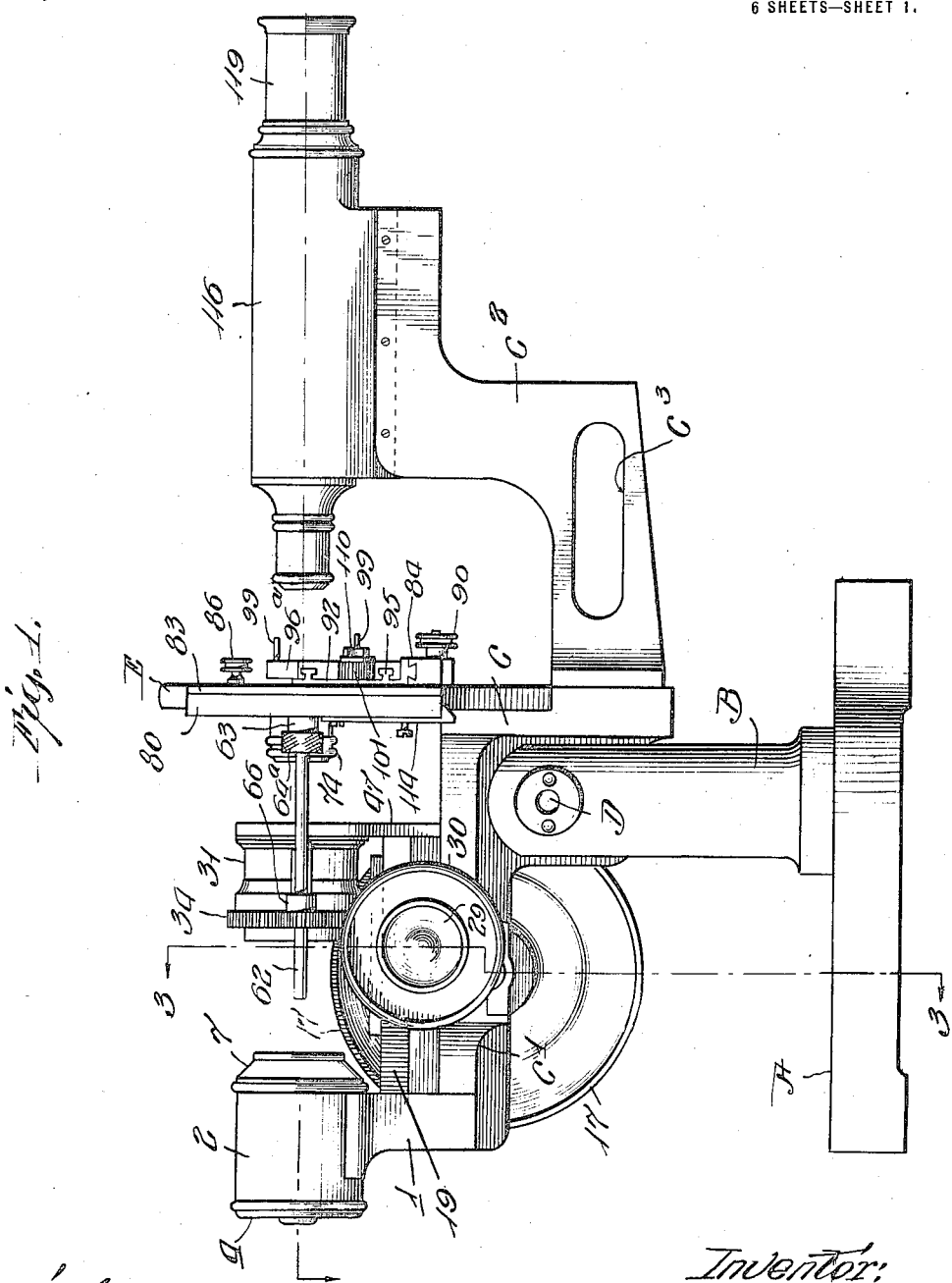

1,281,717.

Patented Oct. 15, 1918.
6 SHEETS—SHEET 2.

Witnesses:
Wm Carolf Eichelman
M. H. McNally

Inventor:
Chas. J. Troppman.
By Benjamin, Roodhouse & Lundy
attorneys

C. J. TROPPMAN.
INSTRUMENT FOR TESTING LENSES.
APPLICATION FILED AUG. 31, 1914.
1,281,717.
Patented Oct. 15, 1918.
6 SHEETS—SHEET 3.
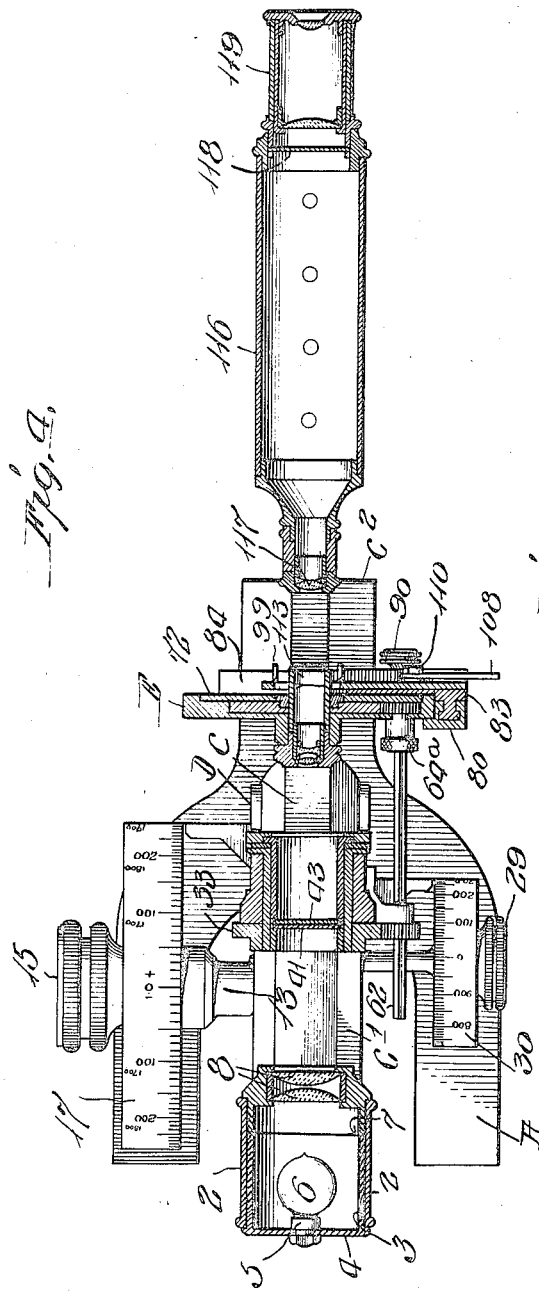
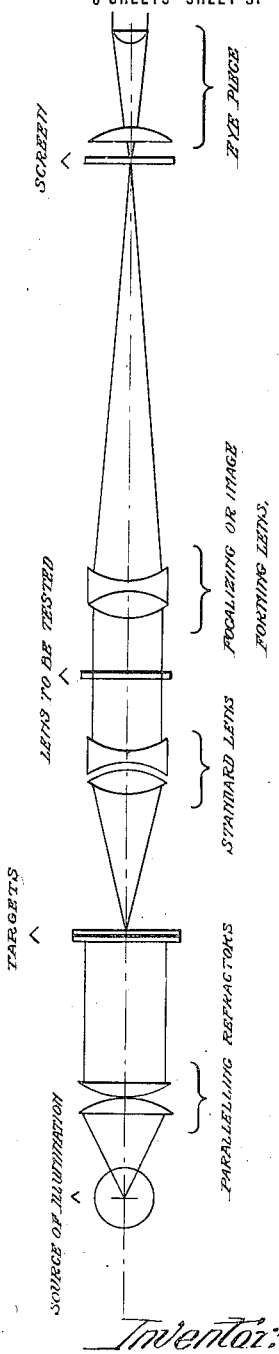
Witnesses:
Inventor:
Chas. J. Troppman
Benjamin, Roadhouse & Lundy
attorneys.

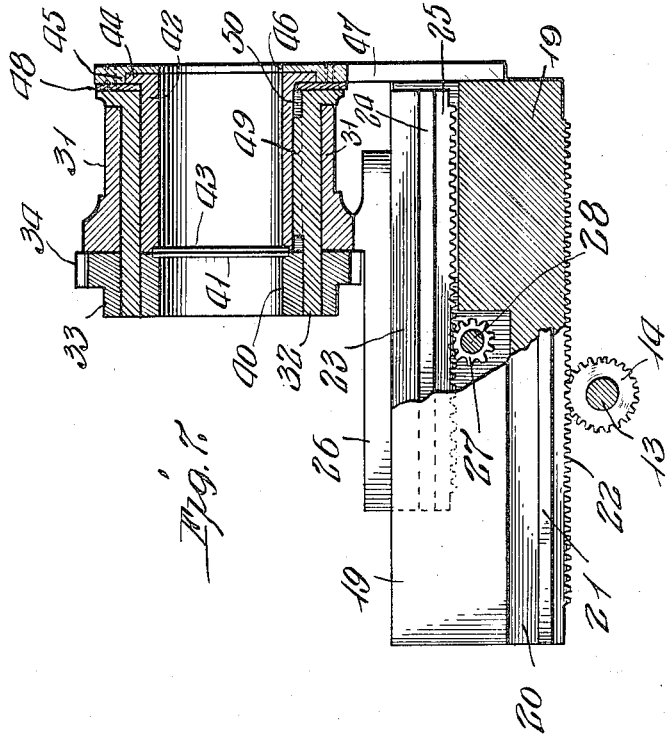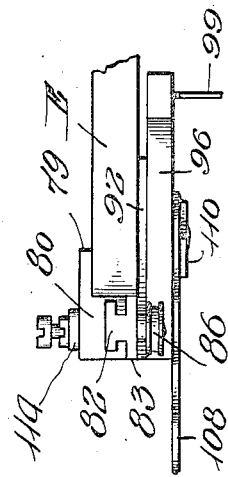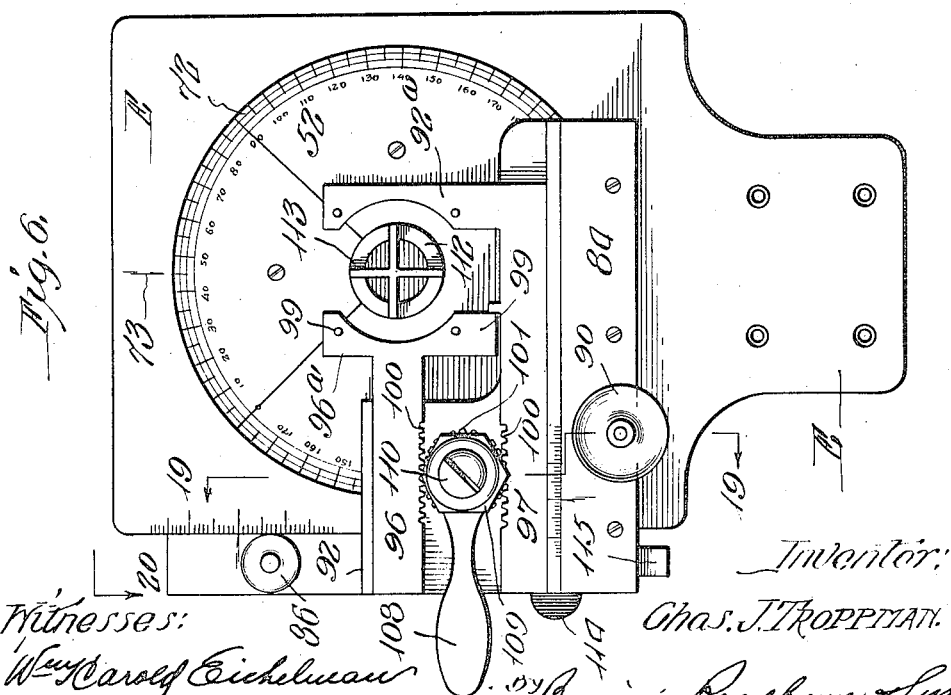

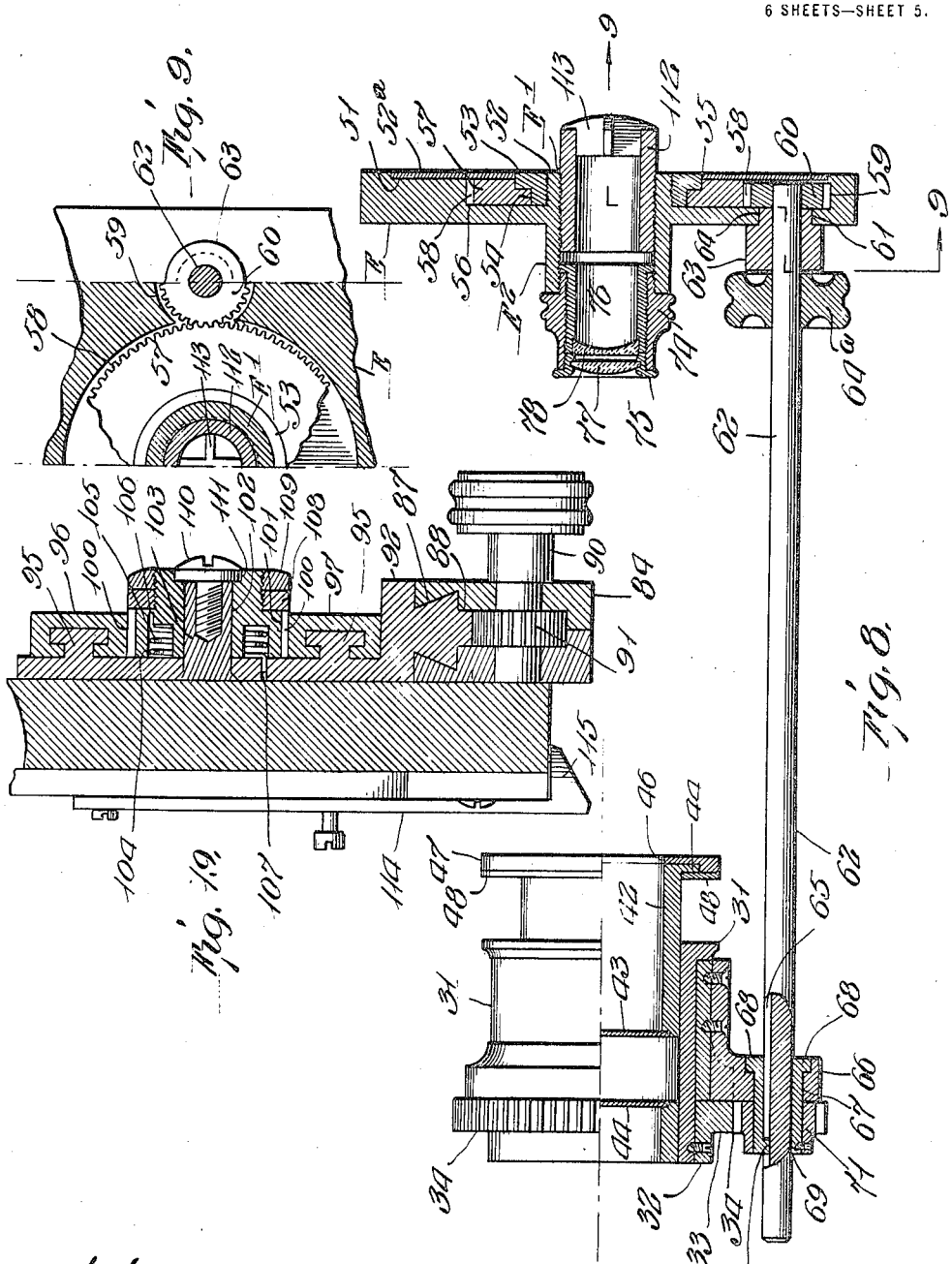

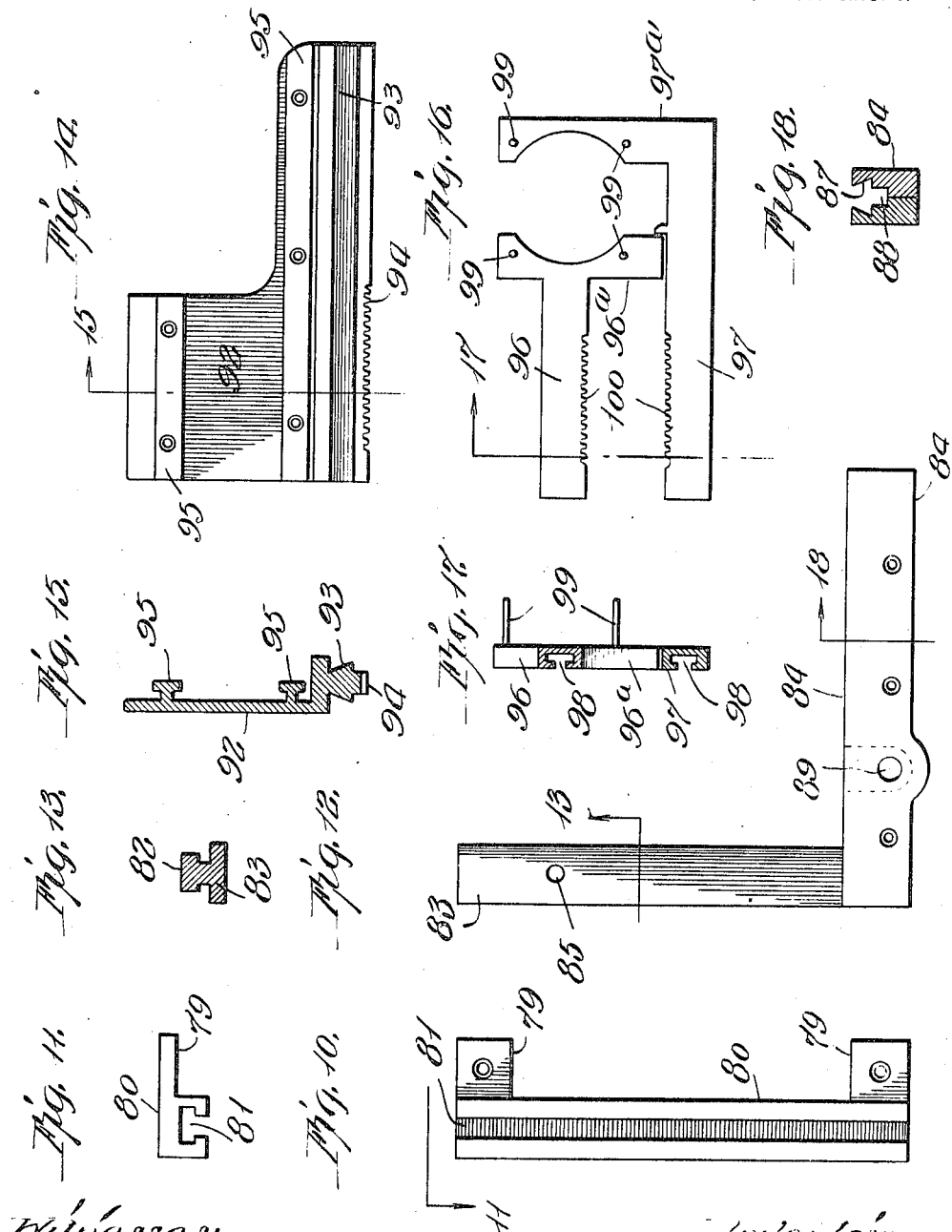

UNITED STATES PATENT OFFICE.

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

INSTRUMENT FOR TESTING LENSES.

1,281,717.  Specification of Letters Patent.  Patented Oct. 15, 1918.

Application filed August 31, 1914. Serial No. 859,317.

*To all whom it may concern:*

Be it known that I, CHAS. J. TROPPMAN, a citizen of the United States, and a resident of Chicago, in the county of Cook and State of Illinois, have invented a new and useful Instrument for Testing Lenses, of which the following is a specification.

My present invention relates to the provision of suitable facilities for testing lenses, and the objects thereof are, first, the embodiment of the necessary facilities for thoroughly analyzing a lens and ascertaining its refractive properties in an instrument which will be easy to manipulate and which will have a high degree of precision or accuracy; second, the provision of such an instrument, which after the same has been adjusted, may be used by comparatively unskilled operatives thereby rendering the instrument useful in the testing of large numbers of lenses in shops and factories.

In the working out of my present invention I have endeavored to obviate the error arising from an arrangement in which the lens under examination is caused to focalize the light and form an image. Such an arrangement involves a consideration of the focal length of the lens under examination and the nodal points or centers of refraction of the respective surfaces of the lens which, so far as I am aware, with the usual test instruments, if not taken into account, will result in error. I have also provided means which will permit of the examination of the refraction upon one meridian of the lens and after the instrument has been adjusted for that meridian another meridian may be examined without disturbing the first adjustment. These facilities are particularly useful in the examining of lenses with cylindrical elements. I have also arranged my instrument so that the location of the optical center is ascertained by the positioning of the lenses to be tested instead of the measurement of refraction which the decentering causes. This I believe is a more direct and accurate arrangement than has heretofore been employed.

I have also introduced a possibility of adjustment with respect to the standard lens which renders it possible to adjust the focal length of the standard lens accurately to the scales upon the instrument. I have also provided, so far as I am aware, a new and desirable means for certainly locating the lens to be tested.

I have attained the above objects by means of the mechanism illustrated in the accompanying drawing in which:

Figure 1 is a longitudinal elevation of the instrument which is the subject matter of the present specification.

Fig. 2 is an elevation of the instrument looking from the operator's end;

Fig. 5 is a schematic view of the optical elements of the instrument;

Fig. 6 is a detail elevational view of the mechanism for holding and moving the lenses to be tested and the dial for showing the meridional dispositions of the test lines of the targets.

Fig. 7 is a detail partially in section of the longitudinal movable carriages.

Fig. 8 is a horizontal sectional detail of the means for rotating the targets.

Fig. 9 is a detail partially in section showing the means for indicating the meridional disposition of the targets.

Figs. 10 and 11 are respectively an elevation and a plan of the track for securing the vertically movable carriage of the lens holding mechanism;

Figs. 12 and 13 are respectively an elevation of the vertically movable lens holding carriage and a section on line 13—13 thereof;

Figs. 14 and 15 are respectively an elevation of the horizontally movable lens holding carriage and a section on line 15—15 thereof;

Figs. 16 and 17 are respectively an elevation of the lens holding members and a section on line 17—17 thereof;

Fig. 18 is a section on line 18—18 of Fig. 12;

Fig. 19 is a section view through the lens holding mechanism assembled on line 19—19 of Fig. 6, and Fig. 20 is a fragmental detail in plan of the means for mounting the vertically movable carriage.

Similar reference characters refer to similar parts throughout the several views.

Figure 3:
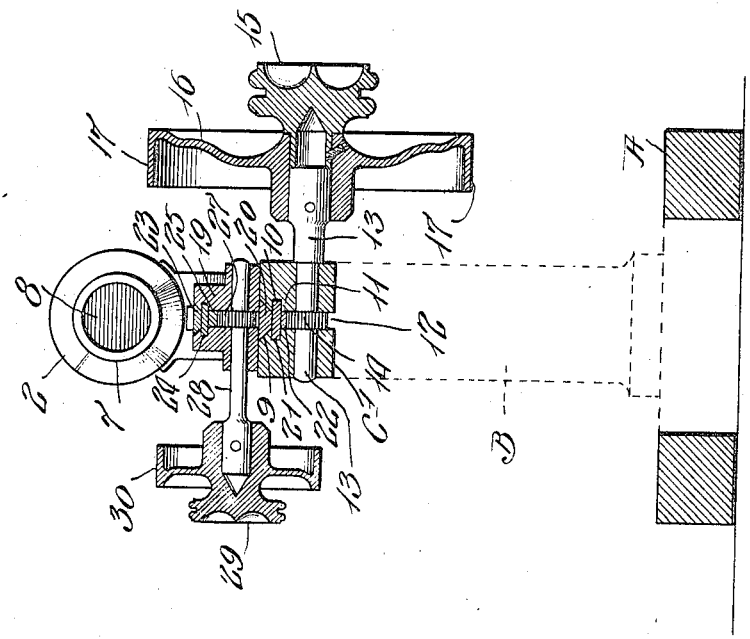
Fig. 3 is a vertical transverse section on line 3—3 of Fig. 1, looking from the operator's end.

It is thought that the invention can best be considered by first discussing the optical arrangements thereof and the objects to be accomplished thereby, and then proceed to a description of the mechanical facilities by means of which the desired optical conditions are secured and the requisite movements of the optical elements are effectuated. Reference should therefore first to be had to Fig. 5.

The optical action of the instrument originates at the source of illumination. Any suitable means may be employed for furnishing the necessary amount of light. An incandescent electric bulb is a very convenient means of illumination, and when such a bulb is employed it is desirable to have condensers or paralleling refractors to refract the light proceeding therefrom in the direction of the axis of the instrument.

In the path of the light proceeding from the refractors are mounted the targets which are preferably black line targets, made by photographic process or otherwise, so that the areas thereof not occupied by the lines will permit a free passage of the light. The lines of the respective targets are disposed at right angles to each other, and facilities, hereafter to be described, are provided for moving the targets along the optical axis of the instrument and for moving one of the targets independently of the other. Facilities are also provided for rotating the targets independently of the longitudinal adjustment so as to dispose the lines thereof in any meridian of the field of vision of the instrument.

Scales are provided in connection with the facilities for moving the targets longitudinally, the zero point upon which indicate a normal position for the targets which will produce no correction. The targets may be brought into substantially the same plane, and positioned its focal length away from the targets, when brought substantially in the same plane and at the zero point of their scales, is a standard lens. The standard lens is preferably formed of a plurality of elements divided by an air space, and means, hereafter to be described, are provided for increasing or decreasing this air space for the purpose of accurately adjusting the focal length of the combination.

It will now be seen that when the targets are a focal length distant from the standard lens, or in the plane of its equivalent focus, light proceeding from the targets to the standard lens will, as the phrase goes, be focused at infinity or be parallel or be as if it proceeded from an object at a great distance.

Means, also hereafter to be described, are provided for supporting the lens to be tested in the plane of the equivalent focus of the standard lens opposite to the normal or zero location of the targets.

It will now be appreciated, that light reaching the plane of the location of the lens to be tested from the targets through the standard lens will be regularly modified or refracted in the proportion that the distance the targets are moved from normal position bears to the focal length of the standard lens. That is to say, if the standard lens is a ten centimeter lens and the target is moved one centimeter farther from the standard lens, the image of the target would be focalized by the standard lens at ten times the focal length of the standard lens from its opposite equivalent focal plane, or one hundred centimeters or one meter therefrom. Or, at the plane of the equivalent focus of the standard lens the light would be converged one tenth of the hundred centimeters, or the amount which it would be converged by a lens of one hundred centimeters or one meter equivalent focus. This relation is constant and effects a divergence of the light upon the same principles when the targets are brought between the plane of the equivalent focus and the standard lens, and when the scales showing the movement of the targets are provided to show this movement in terms of the focal length of the standard lens the scales will show the amount of refraction which is secured by any particular adjustment of the targets. With a lens to be tested in position, adjustments may be made to overcome the refraction of the lens so that the light will leave it in normal condition or without convergence or divergence and the amount of the adjustments to secure this condition will show the power of the lens to be tested.

So far as I am aware lens testing instruments hitherto have been constructed so as to cause the lens to be tested to focalize the image or to form a real image thereof. With such a construction error is liable to occur as the formation of such an image involves the focal length of the lens measured from the optical center of the lens which bears a definite relation to the nodal points or centers of refraction of the respective surfaces. These nodal points are difficult to ascertain and to properly locate after they have been ascertained. With the arrangement just described in which the refraction of the lens to be tested is neutralized and the light leaves the lens to be tested in normal condition free from convergence or divergence no error arises with reference to the formation of the image thereby.

It will also be seen that when the lens to be tested has a cylindrical element the targets may be rotated to bring the lines on one of the targets in the meridian of the cylindrical curvature and then one target may be moved to neutralize the cylindrical curvature and the difference of position between the targets will show the refractive power of the cylindrical element. Also the instrument may be set for lenses of any degree of complication, and then a comparatively inexperienced operator, such as must be employed in factories and shops, can run through any quantity of lenses to see whether they conform to the particular requirements of the adjustment.

In order to ascertain whether the refraction of the lens to be tested has been accurately neutralized, I have employed a focalizing or image forming lens which will form an image of parallel light, or light free from convergence or divergence, upon a screen located at a suitable distance therefrom and I have provided an eye piece by means of which the image formed on the screen may be critically examined.

It will of course be apparent that the mechanical embodiment of a device for realizing the advantages of the application of principles of optics must be more or less approximate and that the degree of approximation is, to an extent, optional and that approximations can easily be made which will secure those advantages to a sufficient degree for all practical purposes. For instance, the test lens may be displaced slightly from the plane of the principal or equivalent focus of the standard lens, and the departure from a uniform scale necessitated thereby will only be so slight that all the practical advantages of such a scale will be retained. Also, the image screen may be displaced from the plane of the principal or equivalent focus of the image forming lens to such a slight extent that the resultant bending of the rays leaving the lens under test to cause them to be focused on the screen, would be so slight that the position of the nodal point of the emergent surface of any ophthalmic lens would be entirely negligible and I desire it understood that any such deviations from the theoretically indicated points are contemplated as included within the scope of my claims.

The mechanical features of the instrument for securing the optical conditions and movements above referred to are as follows:—

The instrument is mounted upon a stand comprising a heavy foot or claw A to give the instrument stability. Arising from the foot or claw, A, is a column or standard, B, the top of which is vertically slotted to receive the frame, C, which is pivotally secured within the said slot by a pintle or arbor, D, which permits the frame C, to be swung at any angle preferred by the operator for making the examination.

The pivoted frame C comprises a table or arm C¹, extending from above the column or standard B, in a direction alining with the parts of the frame which extend into the slotted portion of said column, and from a point somewhat below the top of the table C¹, the frame is extended in an opposite direction to form the arm C² in which is provided the finger slot C³ for convenience in grasping the frame C to adjust it to a proper angle through its pivotal connection with the column B. The outer end of the arm C² is turned upward and extends farther outwardly so as to furnish a long and rigid bearing for the mounting for the viewing lenses and also to bring the viewing lenses in alinement with the source of illumination. The standard lens and the lens holding means are mounted upon or secured to a plate E disposed transversally and secured to the inner end of the table C¹.

Figure 4:
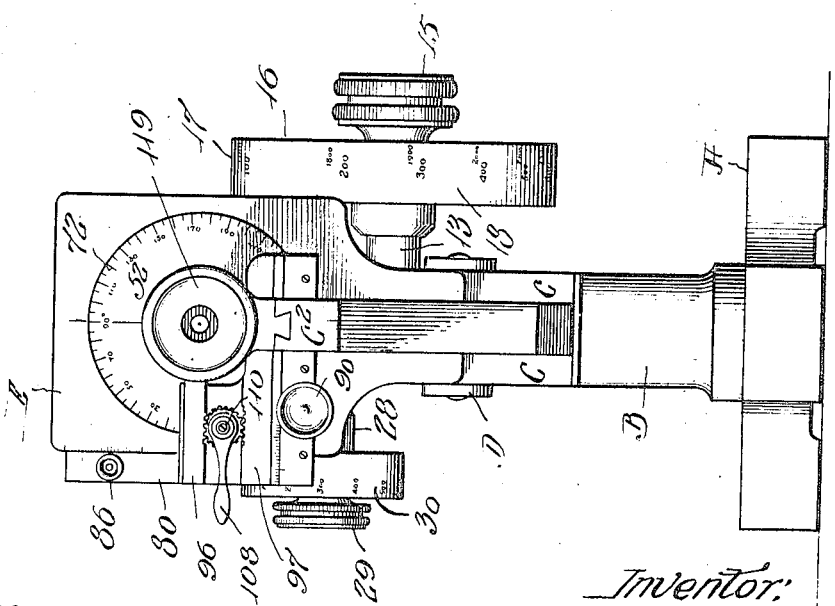
Fig. 4 is a horizontal section through the optical axis of the instrument.

The details of the mounting of the electric bulb which comprises the means of illumination illustrated in the present application are clearly shown in Figs. 1 and 4, and consist of a bracket, 1, screwed or otherwise secured to the outer end of the table C¹. Upon the top of the bracket, 1, is secured a tube, 2, into the outer end of which extends the tubular flange, 3, of a cap member, 4, in the center of which is secured an electric bulb socket 5, into which screws an electric bulb, 6, of a suitable size and character. Into the opposite end of the tube, 2, is screwed or otherwise secured a lens cell in which are mounted suitable condensers or paralleling refractors, 8.

The details of the mounting for the targets are shown in Figs. 1, 2, 3, 4, 7, and 8.

The top of the table C¹ is longitudinally slotted or channeled, as clearly shown in Fig. 3, and for the purpose of securing a free movement of the portion of the target carriage that assembles therewith, without slide or vertical play, this slot is formed so that the upper or opening portion thereof has the vertically converging walls 9. Just below the converging portion of the walls the slot is laterally extended to form a rectangular channel 10 for the carriage retaining plate and below and in the center of the retaining plate portion of the channel and communicating therewith there is a vertical groove, 11, which forms a way and housing for the carriage rack. At a suitable point, 12, longitudinally of the table C¹ the groove 11 is carried through the bottom of the table and at this point is mounted, upon an arbor, 13, extending transversely of the table, a gear, 14, the teeth of which extend upwardly so as to engage the rack of the target carriage housed in the groove, 11. Upon the outer end of the arbor, 13, is mounted a hand wheel or head, 15 which has a disk, 16, of much larger diameter integral therewith, the edge 17 of which is turned laterally to form a cylindrical area of sufficient extent to receive a scale 18 showing the extent of longitudinal movement of the targets carried by the carriage.

The main part of the carriage, 19, is a substantially rectangular block of a suitable size from the bottom of which projects a rail, 20, formed to correspond with the converging walls 9 of the channel in the table $C^1$. To the bottom of the rail 20, are screwed the retaining plate, 21, and rack, 22, fitting within respectively the rectangular channel, 10, and groove, 11, of the table.

The upper face of the main part of the carriage 19, is slotted longitudinally precisely as is the table $C^1$, to receive a converging rail, 23, retaining plate, 24, and rack, 25, of an auxiliary carriage 26, which is moved longitudinally by a gear, 27, carried on an arbor, 28, mounted transversally of the main part of the carriage, 19, in a manner similar to like parts for moving the main portion of the said carriage.

The arbor, 28, is also provided with a head, 29, which has a scale 30 thereon for the purpose of showing the extent of longitudinal movement of the target carried by the auxiliary carriage, which head and scale are similar to the head, 15, and scale 18 of the main portion of the carriage. The above described arrangement will permit of the longitudinal movement of the main part of the carriage, 19, and the auxiliary carriage, 26, simultaneously by turning the head, 15, while the auxiliary carriage may be moved independently of the main part of the carriage by rotating the head 29.

Upon the top and adjacent one end of the auxiliary carriage, 26, is secured a barrel, 31, within which is rotatably mounted a tube, 32, having an annular flange, 33, extending outwardly or laterally therefrom, the periphery whereof is provided with the gear teeth, 34.

Mounted within the end of the tube, 32, and so as to rotate therewith is a comparatively short tube, 40, within and adjacent the inner end of which is mounted one of the targets, 41. Another but somewhat longer tube, 42, slides or telescopes within the tube 32, so that its inner end may be brought adjacent the inner end of the tube, 40, and adjacent the inner end of the tube, 42, is mounted another target, 43. The outer end of the tube, 42, is provided with an outwardly extending annular flange, 44, which fits within an annular groove or depression, 45, made about the edge of an aperture, 46, in a plate, 47, secured to and arising from the front face of the main portion of the carriage, 19. The flange, 44, is held within the groove or depression 45, but so as to permit of the rotation of the tube, 42, with respect to the plate, 47, by means of the ring shaped plate, 48, screwed to the plate, 47, so that its inner edge extends over the flange 44 and the groove 45. A spline, 49 is provided longitudinally of and upon the inside of the tube 32, which fits within a splineway, 50, provided upon the outside and longitudinally of the tube, 42, so that while the outer collar, 31, and the tube, 32, and tube 40 carried thereby may be moved longitudinally independently of the tube, 42, a rotation of the tube, 32, will cause a simultaneous rotation of the tube, 40, and the tube, 42, together with the targets 41, and 43 mounted respectively within them.

From the foregoing description it will be seen that the targets 41 and 43, may be moved longitudinally simultaneously by a rotation of the head, 15, that the target, 41, may be moved longitudinally independently of the target 43 by a rotation of the head 29; and that both targets may be rotated simultaneously in any longitudinal position in which they may be adjusted.

For the purpose of readily rotating the targets through the instrumentalities just described and also for indicating the meridians of the field of vision in which the lines of the targets are disposed I have provided the following mechanism: The plate E is screwed or otherwise secured to the inner end of the table portion $C^1$ of the frame C so as to extend transversely of the frame C and upwardly beyond the optical axis of the instrument is an aperture $E^1$. In front of the plate E, or on the side thereof facing the operator, is provided a groove or depressed area 51, which is concentric with the aperture $E^1$ and is separated therefrom by the annular shoulder, 52, which shoulder is exteriorly threaded. Fitting within the depressed area, 51, is a dial $52^a$ which is held in position by the flanged centrally bored and threaded bushing, 53, which screws upon the annular shoulder 52, and the flange whereof fits within a channel, 54, provided in the face of and adjacent to a central aperture, 55, in the dial through which extends the said bushing, 53.

At the rear of the depressed area, 51, communicating and concentric therewith is a further depressed area, 56, of a lesser diameter than the area, 51, into which extends a disk, 57, made integral with or secured to the dial, $52^a$, which said disk, has provided on the edge thereof gear teeth, 58. Also to the rear of the depression 51 is a smaller circular depression, 59, which alines with and slightly overlaps the depression, 56, so that the teeth of the gear wheel, 60, housed in said depression, 59, will mesh with the teeth 58, upon the periphery of the disk, 57. The metal of the plate E is bored through centrally and back of the depression 59, at 61, to permit of the passage of the rod 62, which extends parallel with the path of longitudinal travel of the main and auxiliary carriages, 19 and 26. A bushing 63 a reduced portion 64, of which has a frictional fit in the bore, 61, constitutes a bearing for the rod, 62, and back of the bushing, 63, the rod, 62, is provided with a knurled finger wheel, 64ᴬ, for more readily rotating it.

The portion of the rod 62 which is opposite the path of movement of the carriages is provided with a spline-way or feather-way, 65.

Upon the side of the collar, 31, adjacent the rod 62 is provided a bracket, 66, within which is a suitable bore, 67, in which is rotably mounted the flanged sleeve 68, through the central aperture, 69 of which passes the rod, 62, and which is provided with a spline or feather 70 which extends into the spline-way or feather-way 65 of the rod, 62. Upon the portion of the sleeve, 68, which extends out of its bearing 67, in the bracket, 66, is secured a gear, 71, which meshes with the gear teeth, 34, upon the annular flange, 33, of the tube, 32.

The edge of the face of the dial, 52ᵃ, is provided with a suitable scale, 72, which coöperates with a line, 73, upon the face of the plate E to indicate the meridian in which the lines of the target have been adjusted.

It will now be seen that a rotation of the knurled finger wheel 64ᵃ will rotate the targets simultaneously in any position in which they may be positioned longitudinally and will at the same time indicate through the rotation of the dial 52 in what position the lines of the targets are brought by such rotation.

The standard lens and its mounting and also the means for securing the lens to be tested are both carried by or secured to the plate E.

The mounting for the standard lens is as follows:—About the edges of the aperture, E¹, and upon the side of the plate E facing the targets, is provided an annular laterally extending flange E², which together with the aperture E¹ is interiorly threaded to receive the exteriorly threaded end of an interiorly threaded collar, 74, into the respective ends of which are screwed mountings 75 and 76, for the respective elements 77 and 78 of the standard lens.

It will now be seen that an adjustment of the lens elements 77 and 78 is possible by means of which the air space between them may be increased or diminished, thereby increasing or diminishing the focal length of the combination.

Adjacent the face of the plate opposite to the standard lens is disposed the means for securing the lens to be tested, the structure of which is illustrated in detail in Figs. 1, 2, 4, 5, 6, and 11 to 19 inclusive to which particular reference may be had.

To the back and edge of the plate E is secured, by means of screws or otherwise passing through the ears or lateral extensions, 79, the vertical plate 80, illustrated respectively in elevation and plan in Figs. 10 and 11. In the face of the plate 80 is the vertically disposed T section slot 81 in which slides the T rail 82 located upon the back of the vertical member 83 of the L shaped vertically movable carriage illustrated in Figs. 12, 13, and 18. The vertical member 83, is provided with an interiorly threaded transverse bore, 85 to receive a set screw 86, by means of which the vertical carriage may be secured in any desired position. The horizontal member 84, of the vertically movable carriage comprises two plates secured together by suitable screws and in these plates and opening at the adjacent upper edges thereof is provided the under-cut channel, 87, with the rectangular channel rack housing 88, in the bottom thereof as clearly shown in Fig. 18. The plates forming the horizontal member 84 are further bored transversely at 89 to receive the knurled headed arbor, 90 upon which is mounted a gear, 91, the teeth of which extend into the rack housing, 88, as shown in Fig. 19. The horizontally movable carriage of the lens holding means comprises a plate, 92, of right angled section as shown in Fig. 15, upon the lower face of the horizontal flange of which is provided a V sectional rail, 93, on the bottom of which is a rack, 94, which are respectively adapted to assemble with the under cut channel 87 and rack housing, 88, of the vertically movable carriage. Upon the face of the vertical flange of the horizontally movable carriage plate 92 are two parallel horizontally disposed T section rails, 95, upon which are mounted the upper and lower lens holding and centering members, 96 and 97, the rear faces of which are provided with T section slots, 98, adapted to, assemble with the rails 95, aforesaid. The upper lens holding member, 96 has at one end a transversely disposed arm 96ᴬ, and the lower lens holding member, 97, is provided with a laterally extended arm 97ᴬ which comes opposite the transversed arm 96ᴬ of the upper member. These arms 96ᴬ and 97ᴬ are provided with laterally extending pins 99, which are adapted to contact with the periphery and center lenses the edges of which have been symmetrically shaped.

The lens holding members are moved simultaneously so as to separate or bring the arms 96ᴬ and 97ᴬ closer together through the instrumentality of the racks 100, provided on the facing edges of the portions of members 96 and 97 which engage the rails 95. The said racks, 100 being engaged by a gear, 101, the central portion 102, of which is bored to receive the stud or arbor, 103 one end of which is secured in any suitable manner to the plate 92 midway between the T section rails 95. In one face of the said gear is an annular chamber or spring housing, 104, for the reception of the spring 105, one end of which is bent to enter a bore 106 in the bottom of the spring housing and the other end is bent to enter a bore, 107, in the plate, 92.

The action of the spring is to rotate the gear so as to normally hold the arms 96$^A$ and 97$^A$ closest together. The arms 96$^A$ and 97$^A$ are separated for the purpose of receiving lenses through the following instrumentalities:—

The side of the gear opposite the annular chamber, 104, is reduced and threaded to receive the arm, 108, which is held in position by the retaining or lock nut, 109. The entire gear construction is held in position upon the arbor, 103, by means of the screw 110 which enters a screw hole, 111, tapped into the top of the arbor for its reception.

For positioning the lens to be tested the proper distance from the standard lens, heretofore described, I have provided a piece of tubing, 112, of suitable length which is screwed into the aperture E$^1$ in the plate E, and which extends between the arms 96$^A$ and 97$^A$ of the lens holding mechanism, and in the outer end of the tube 112 is mounted the cross, 113, the arms of which are laterally extended and have their outer edges curved backwardly, as shown in Fig. 8 so that the center of said cross can be brought against the center of either a convex or concave lens.

The lens holding means heretofore described are suitable for cut or shaped lenses, or lenses which have a symmetrical outline. When it is desired to examine an uncut lens with an irregular outline, the set screw 86 is loosened and the vertically movable carriage is permitted to descend until it is out of the way of the opening of the tube 112 and the uncut lens is held against the cross 113 by hand.

I have provided upon the back of the plate E a spring, arm, or latch, 114, the lower end of which is bent at 115 to engage the vertically movable carriage when the mechanism is in proper position to center vertically a symmetrical lens held by the pins, 99, so that after examining an uncut lens the lens holding carriage may be brought into proper position by merely elevating the vertically movable carriage until it is engaged by the spring arm, 114.

Suitably secured to the arm C$^2$ of the frame C is the telescope or arrangement or mounting for the viewing lenses. This telescope comprises a tube, 116, in the inner end of which is mounted an objective lens, 117, capable of focalizing parallel light, or light which is neither converged or diverged, upon a suitable screen 118 mounted within and adjacent the opposite end of said tube, 116, and fitting within the tube 116 adjacent the screen 118 is a suitable eye-piece, 119, for magnifying and viewing the image formed upon the screen, 118.

Having described my invention, what I claim as new and desire to secure by Letters Patent is:—

1. An instrument for testing lenses comprising means for locating a lens to be examined, a standard lens located the focal length of said standard lens from the lens to be examined, targets upon the opposite side of said standard lens, and means for moving said targets simultaneously and one of said targets independently longitudinally of and in the optical axis of said standard lens.

2. An instrument for testing lenses comprising means for locating a lens to be examined, a standard lens located the focal length of said standard lens from the lens to be examined, targets upon the opposite side of said standard lens, and means for moving said targets simultaneously and one of said targets independently longitudinally of and in the optical axis of said standard lens, and means for rotating said targets.

3. An instrument for testing lenses comprising means for locating a lens to be examined, a standard lens located the focal length of said standard lens from the lens to be examined, targets upon the opposite side of said standard lens, and means for moving said targets simultaneously and one of said targets independently longitudinally of and in the optical axis of said standard lens, and means for simultaneously rotating said targets independently of their longitudinal adjustment.

4. In an optical instrument, a standard lens, and independent targets disposed in different meridians and movable in and longitudinally of the optical axis of said standard lens.

5. In an optical instrument, a lens, targets disposed in different meridians and movable simultaneously and independently in and longitudinally of the optical axis of said lens.

6. In an optical instrument, a standard lens, and targets disposed in different meridians and movable in and longitudinally of the optical axis of said standard lens, and scales showing the amount of movement of said targets from the plane of equivalent focus of said lens, or from each other in terms of the equivalent focus of said lens.

7. In an optical instrument, a lens, targets adapted to be illuminated by transmitted light disposed in different meridians and movable simultaneously and independently in and longitudinally of the optical axis of said lens.

8. In an optical instrument, a lens, targets adapted to be illuminated by transmitted light disposed in different meridians and movable simultaneously and independently in and longitudinally of the optical axis of said lens, and means for rotating said targets independently of their longitudinal disposition.

9. In an instrument for testing lenses having a standard lens, means for locating a lens to be tested a definite distance from said standard lens comprising a cross with laterally extended arms, said arms being cut away upon one side so as to leave their point of intersection free to contact the surface of a lens.

10. In an instrument for testing lenses having a standard lens, means for locating a lens to be tested comprising a geometric figure with axially intersecting bars, the bars of said figure being extended laterally, or in the direction of the axis, and being cut away upon one side so as to leave the point of intersection extended and free to contact the surface of a lens.

11. In an instrument for testing lenses, having a standard lens, means for locating a lens to be tested comprising a member having apertures therein for the passage of the light, said member being adapted to be disposed in the path of light and having a point extended and located in the axis of the path of light adapted to contact the surface of a lens.

12. An instrument for testing lenses comprising means for locating a lens to be examined, and means for neutralizing the refraction of said lens comprising a standard lens located the focal length of said standard lens from the lens to be examined, and a target upon the opposite side and movable longitudinally of and in the optical axis of said standard lens, and a focalizing or image forming lens and a translucent screen for receiving the image formed by said lens located in the plane of its equivalent focus.

13. An instrument for testing lenses comprising a principal or standard lens, a target movable longitudinally of and in the optical axis of the said principal lens, scales for showing the extent of movement of said target from the plane of the equivalent focus of said principal lens in terms of the said focal length of the said principal lens, means for locating a lens to be tested transversely to the optical axis, and in the plane of the principal focus of said principal lens opposite to the path of movement of said target.

14. In an optical instrument, a standard lens, and separate targets disposed in different meridians and independently movable in and longitudinally of the optical axis of said standard lens and means for rotating said targets.

15. In an instrument of the class described, the combination with a positive lens and an illuminated diagram, of means for varying the optical power of rays of light, radiant from said illuminated diagram, incident upon a lens under test, to thereby compensate for the optical power of said lens under test by causing the rays of light to enter said positive lens parallel.

16. In an instrument of the class described, the combination with a positive lens and means for viewing an image formed at its principal focus, and an illuminated diagram, of a support for a lens to be tested, between the said positive lens and the illuminated diagram, and means for varying the separation between the illuminated diagram and the lens under test for the purpose of varying the optical power of light incident upon the lens under test, to thereby bring the rays delivered from said lens under test to said positive lens into parallelism.

17. In an instrument of the class described, the combination with a positive lens and means for viewing an image formed at its principal focus and an illuminated diagram, of a support for a lens to be tested between said positive lens and the illuminated diagram, a lens system interposed between the illuminated diagram and the lens to be tested, and means for varying the optical power of light delivered by said lens system to the lens under test to thereby cause rays of light radiant from said illuminated diagram to emerge parallel from the lens under test, and thus secure parallel incidence at said positive lens.

18. In a positive lens system of which the lens under test forms a component part, means for supporting the lens under test, a diagram screen and means for adapting said screen to the position of the principal focus of said lens system, a scale for indicating, in terms of the optical power of the lens under test, the position of said screen relative to said lens system, a positive lens facing said lens system and adapted to form an image of said diagram at its principal focus, means for illuminating said diagram screen, and means for viewing the image of said diagram screen formed at the principal focus of said positive lens.

19. In an apparatus of the class described, a lens, a translucent screen placed at the principal focus of said lens, a lens system facing said lens, a diagram, means for moving said diagram relative to said lens system, means for holding the lens under test between said lens and said lens system, means for illuminating said diagram, and means for viewing the image of said diagram formed on said translucent screen.

20. In an apparatus of the class described, the combination of a positive lens and a positive lens system facing each other, said lens system including a lens under test, an object, said object being so related to said lens system that when the object is placed at the principal focus of said lens system its image will be formed at the principal focus of said lens, means for viewing said image, the position of the plane of the principal focus of said lens system being a measure of the optical power of the lens under test.

21. In an apparatus of the class described, a lens, a translucent screen placed at the principal focus of said lens, a lens system facing said lens, a diagram, means for holding the lens to be tested between said lens and said lens system, means for moving said diagram relative to said lens system, a scale for indicating, in terms of the optical power of said lens under test, the position of said diagram relative to said lens system whereby parallel rays emerge from said lens under test, means for rotating said diagram about the optic axis, a protractor for indicating the extent of said rotation, means for illuminating said diagram, and means for viewing the image of said diagram formed upon said translucent screen.

22. In an apparatus of the class described, a positive lens system of which the lens under test forms a component part, means for supporting the lens under test, a diagram screen and means for adapting said screen to the plane of the principal focus of said lens system, a scale for indicating, in terms of the optical power of the lens under test, the position of said screen relative to the position of the plane of the principal focus of said lens system when the power of the lens under test is zero, means for rotating said diagram screen about the optic axis, a protractor for indicating the extent of said rotation, a positive lens facing said lens system and adapted to form an image of said diagram screen at its principal focus, means for illuminating said diagram screen, and means for viewing the image of said diagram screen formed at the principal focus of said positive lens.

23. In an instrument for testing lenses having a standard lens, means for locating a lens to be tested with relation to said standard lens comprising a member having an aperture for the passage of light, said member being disposed in the path of light and adapted to contact the surface of the lens to be tested.

24. An instrument for testing lenses comprising means for locating a lens to be examined, a scale disposed parallel to the optical axis of said lens, a target movable longitudinally with respect to said scale, a standard lens comprising a plurality of lens elements located midway between said lens locating means and the zero point upon said scale, and means for adjusting said lens elements so as to make the equivalent focal length of said standard lens equal its distance from said lens locating means and said zero points.

25. An instrument for testing lenses comprising means for locating a lens to be examined, and means for neutralizing the refraction of said lens comprising a standard lens located in a plane at a distance approximately the focal length of said standard lens from the lens to be examined, a target upon the opposite side and movable longitudinally of and in the optical axis of said standard lens, a focalizing or image forming lens, and means for viewing the image formed thereby at approximately the plane of its principal or equivalent focus.

In testimony whereof I have hereunto set my hand in the presence of two witnesses.

CHARLES J. TROPPMAN.

Witnesses:
E. O. TROEGER,
BENJ. T. ROODHOUSE.